Aug. 5, 1941.  F. R. FAGEOL ET AL  2,251,584
PASSENGER VEHICLE
Filed May 25, 1938  12 Sheets-Sheet 1
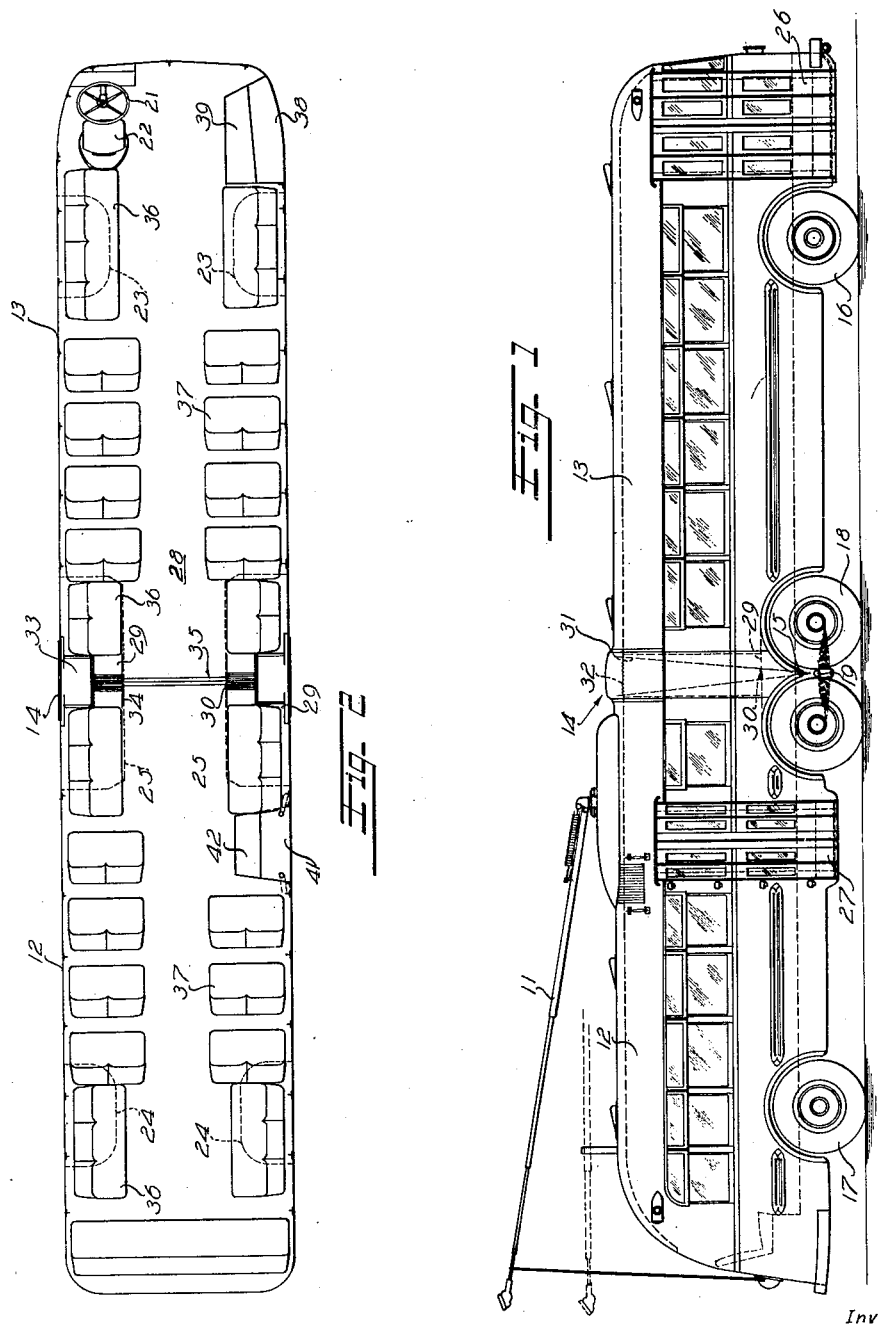
Inventors
Frank R. Fageol
William B. Fageol
Strauch & Hoffman
Attorneys Aug. 5, 1941.         F. R. FAGEOL ET AL         2,251,584
                      PASSENGER VEHICLE
              Filed May 25, 1938      12 Sheets-Sheet 2
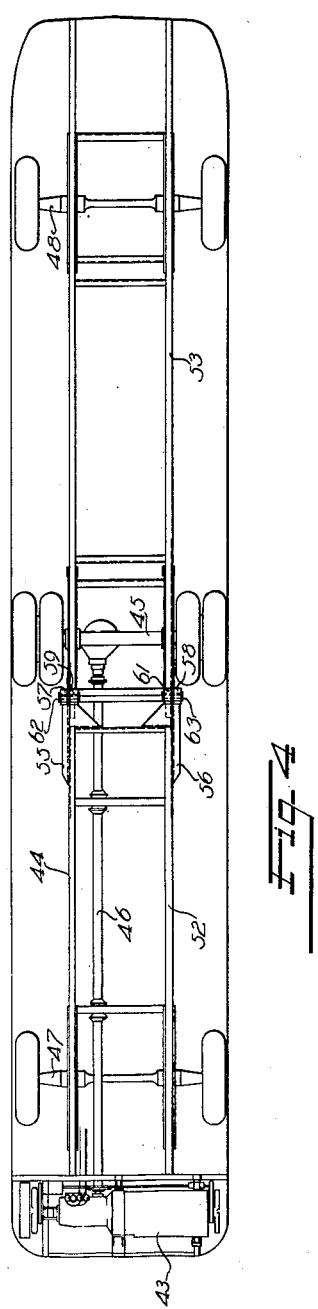
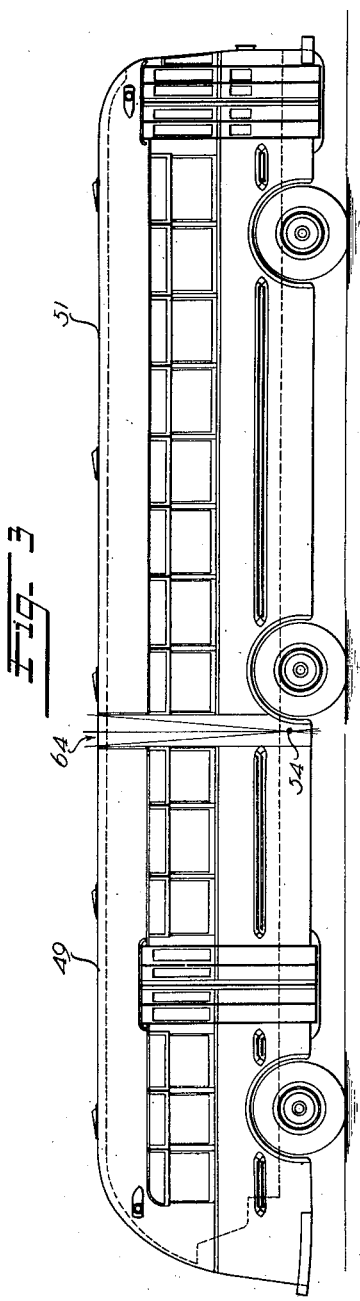
Inventors
Frank R. Fageol
William B. Fageol
Strauch & Hoffman
Attorneys Aug. 5, 1941.  F. R. FAGEOL ET AL  2,251,584
PASSENGER VEHICLE
Filed May 25, 1938   12 Sheets-Sheet 3
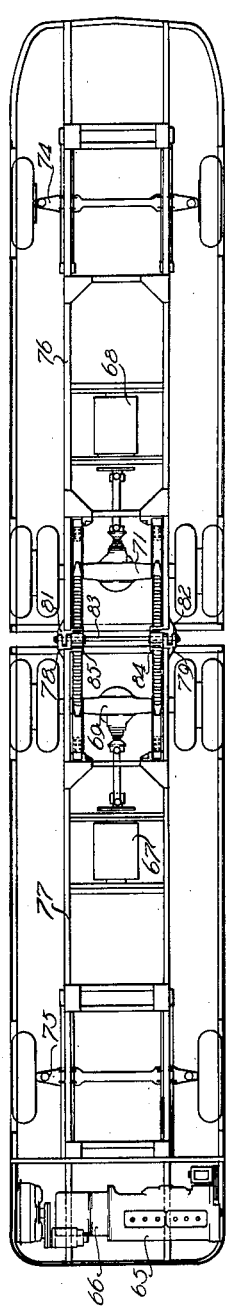
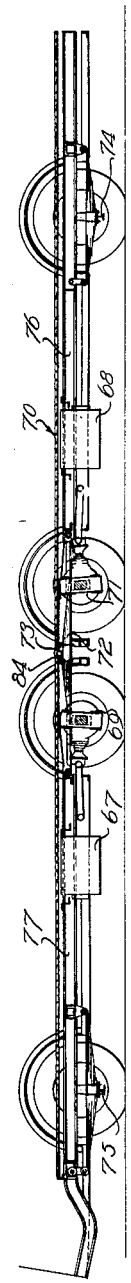
Inventors
Frank R. Fageol
William B. Fageol
Strauch & Hoffman
Attorneys

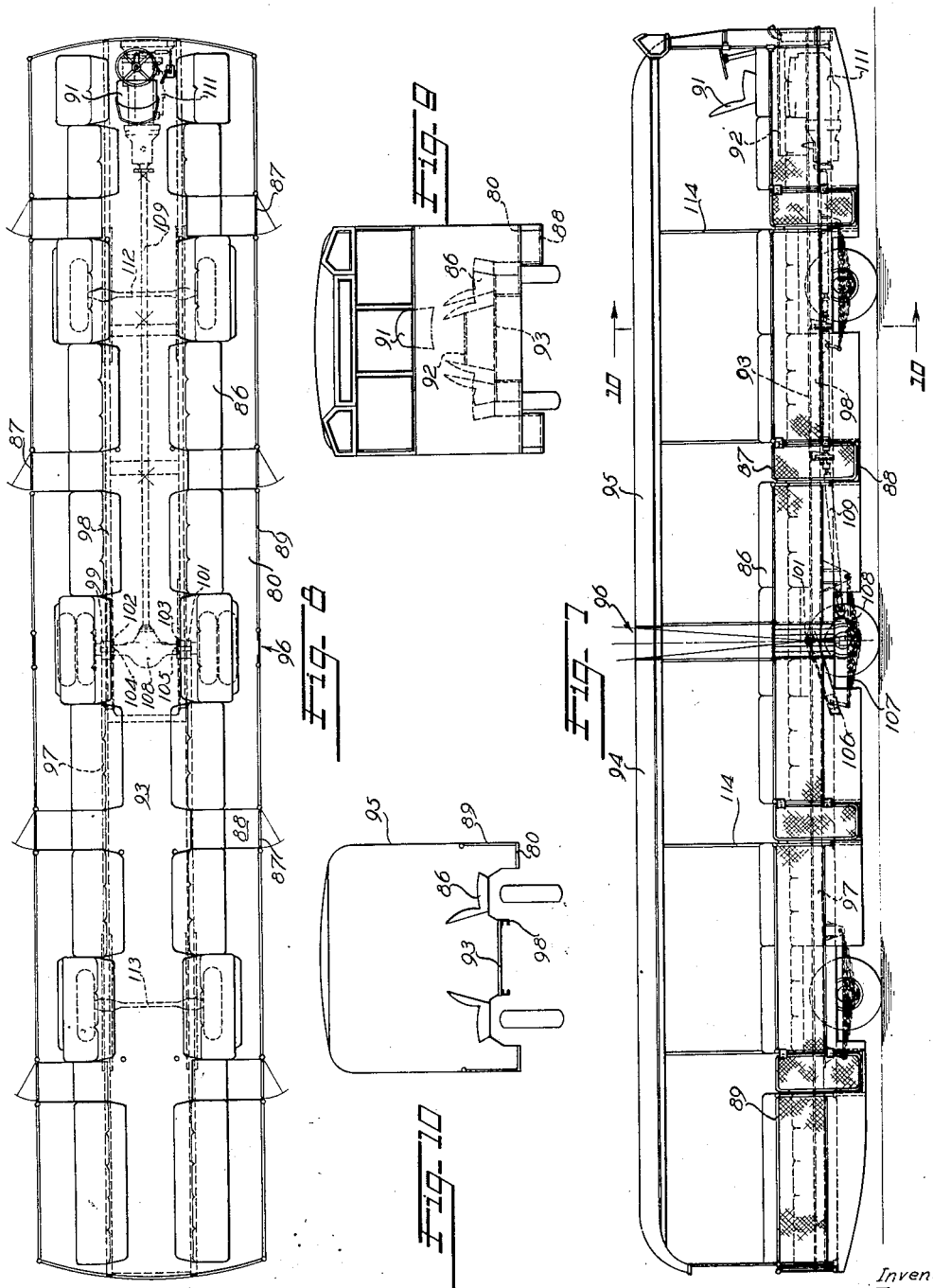

Aug. 5, 1941.  F. R. FAGEOL ET AL  2,251,584
PASSENGER VEHICLE
Filed May 25, 1938  12 Sheets-Sheet 5
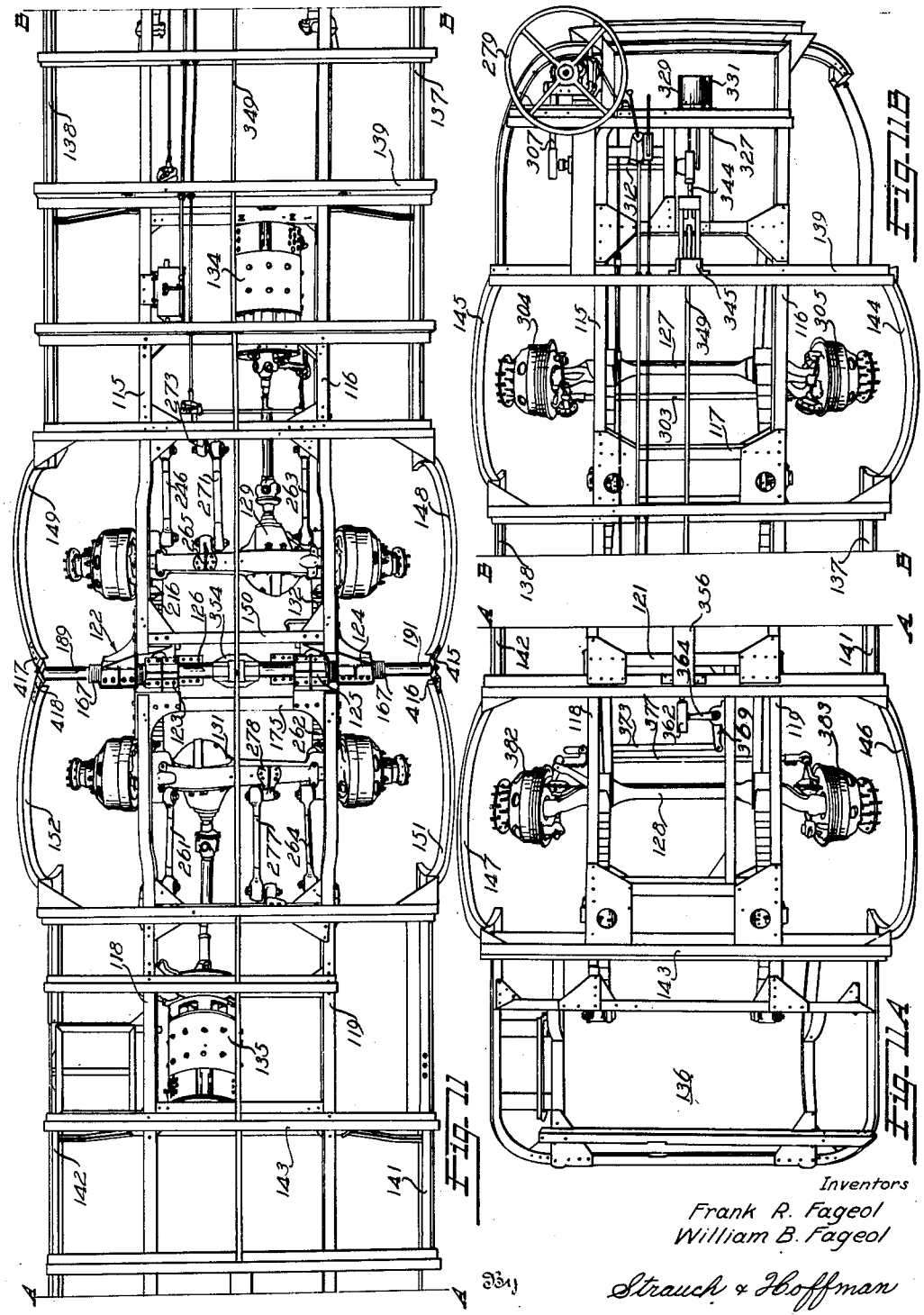
Inventors
Frank R. Fageol
William B. Fageol
Strauch & Hoffman
Attorneys

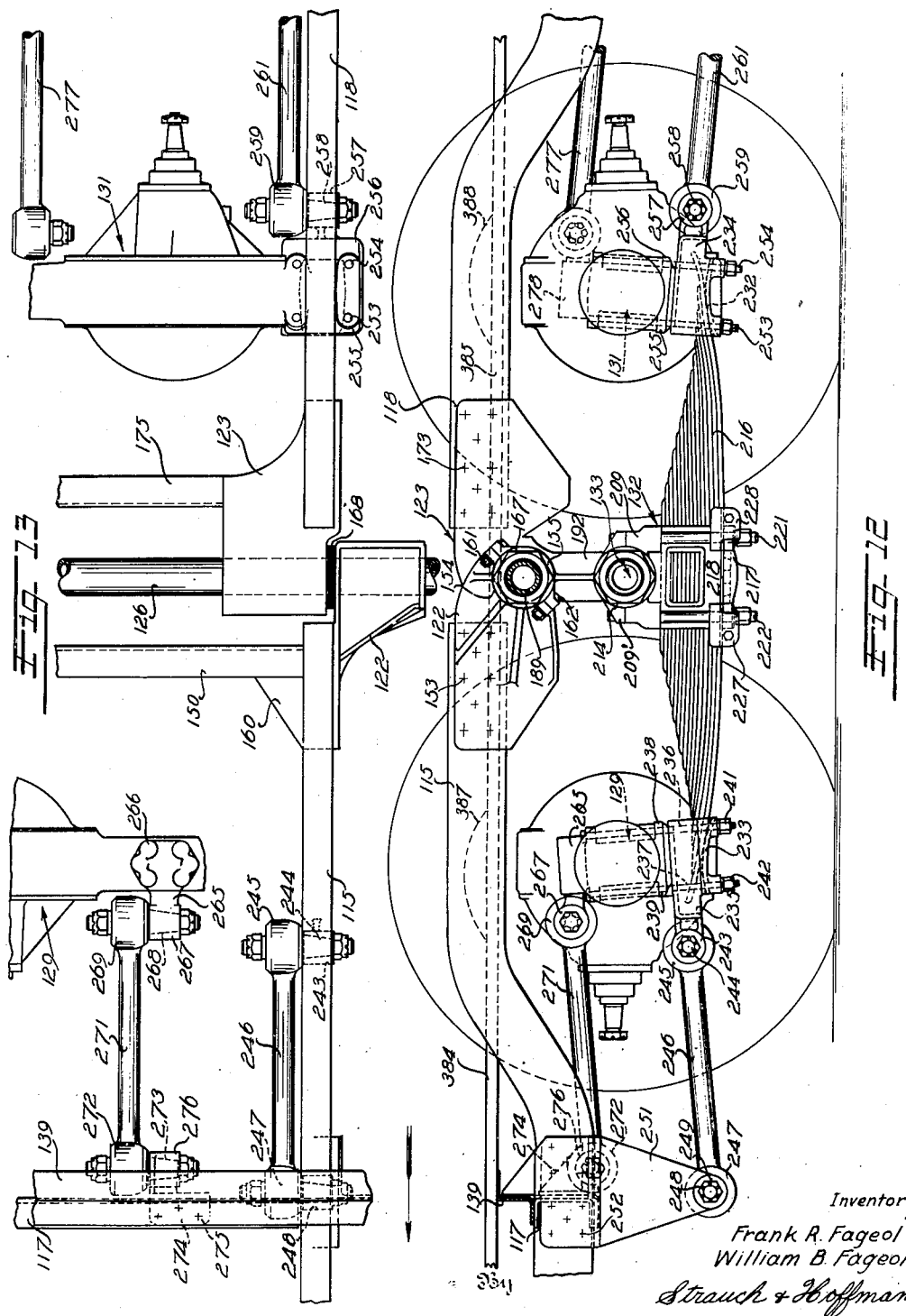

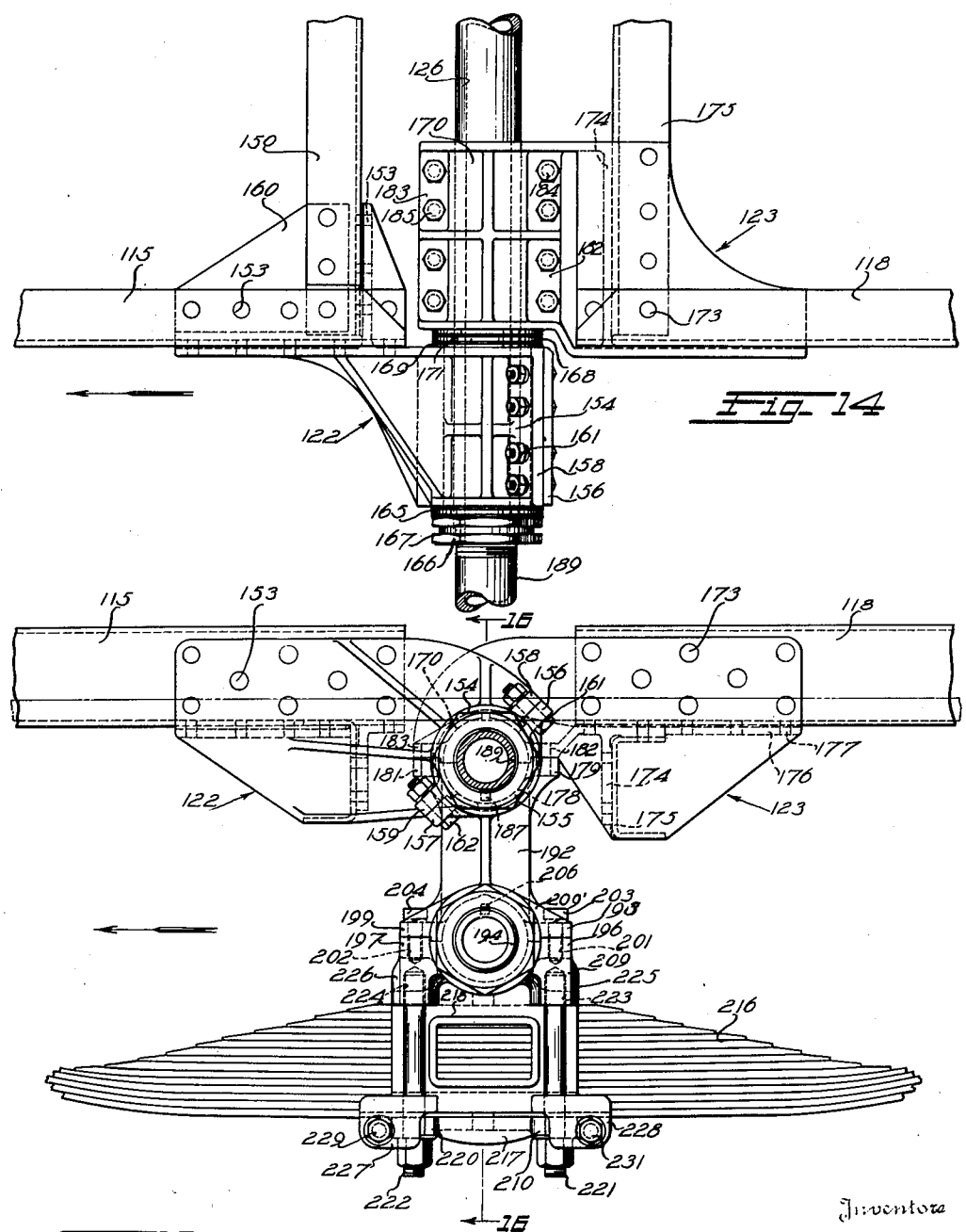

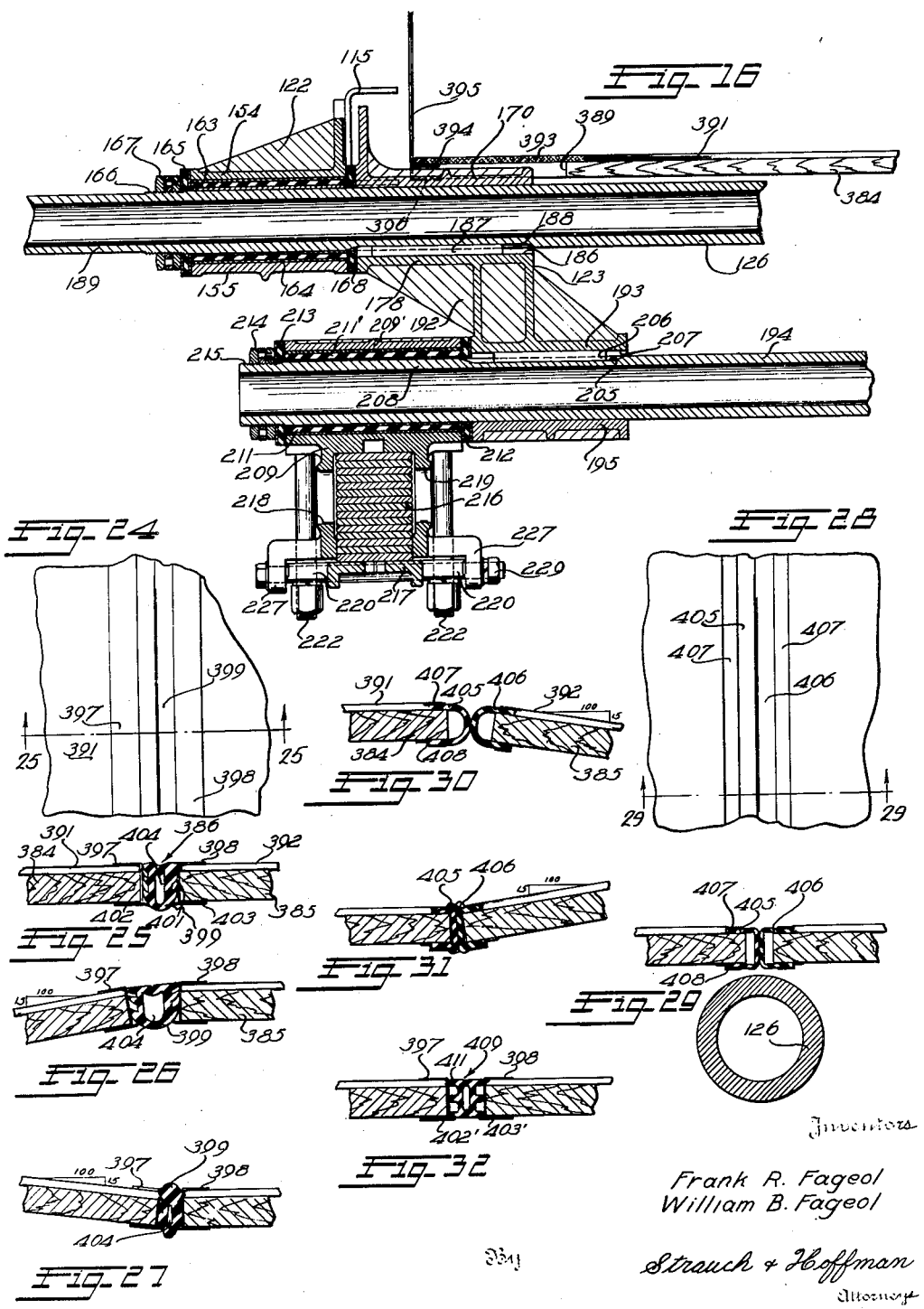

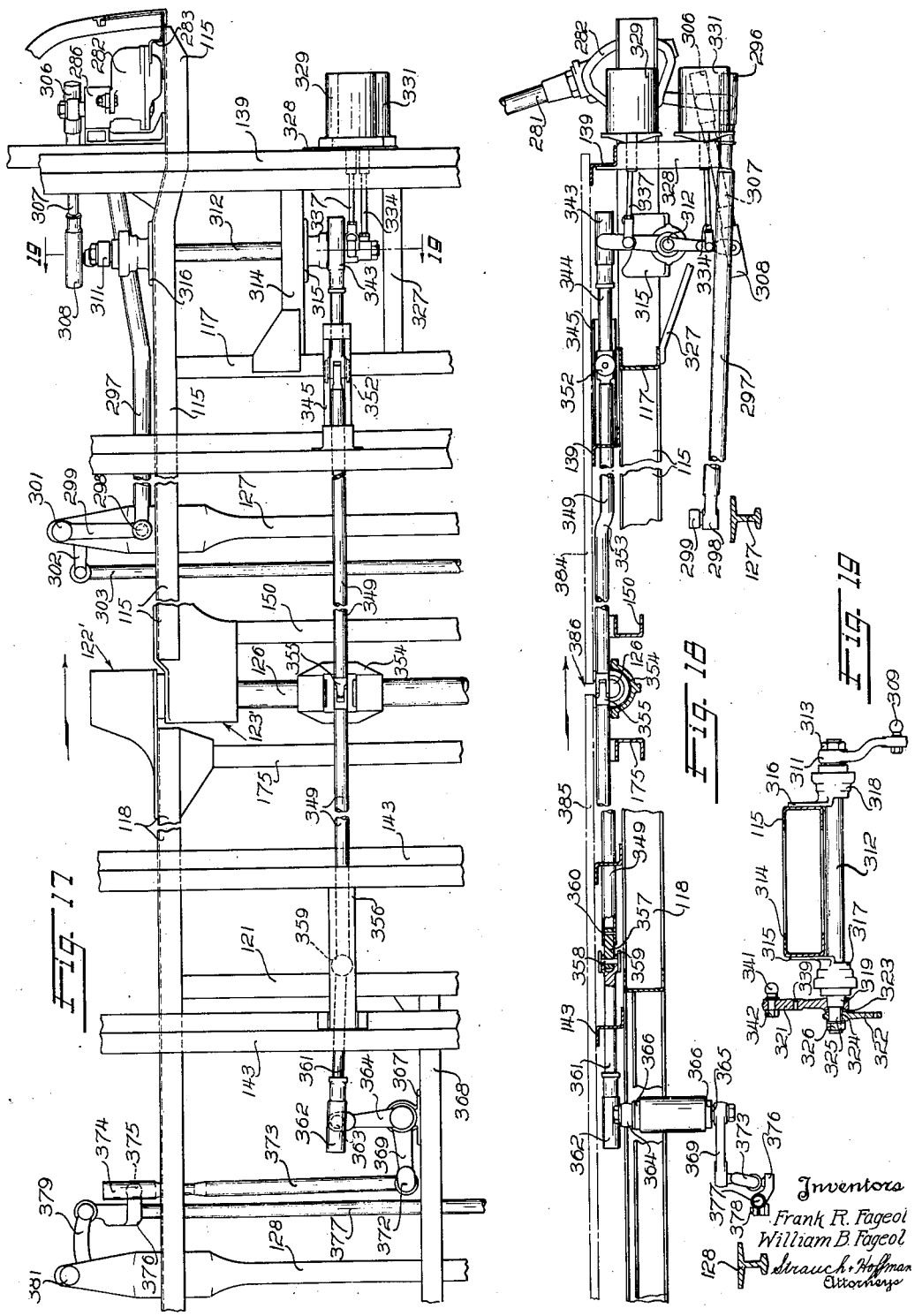

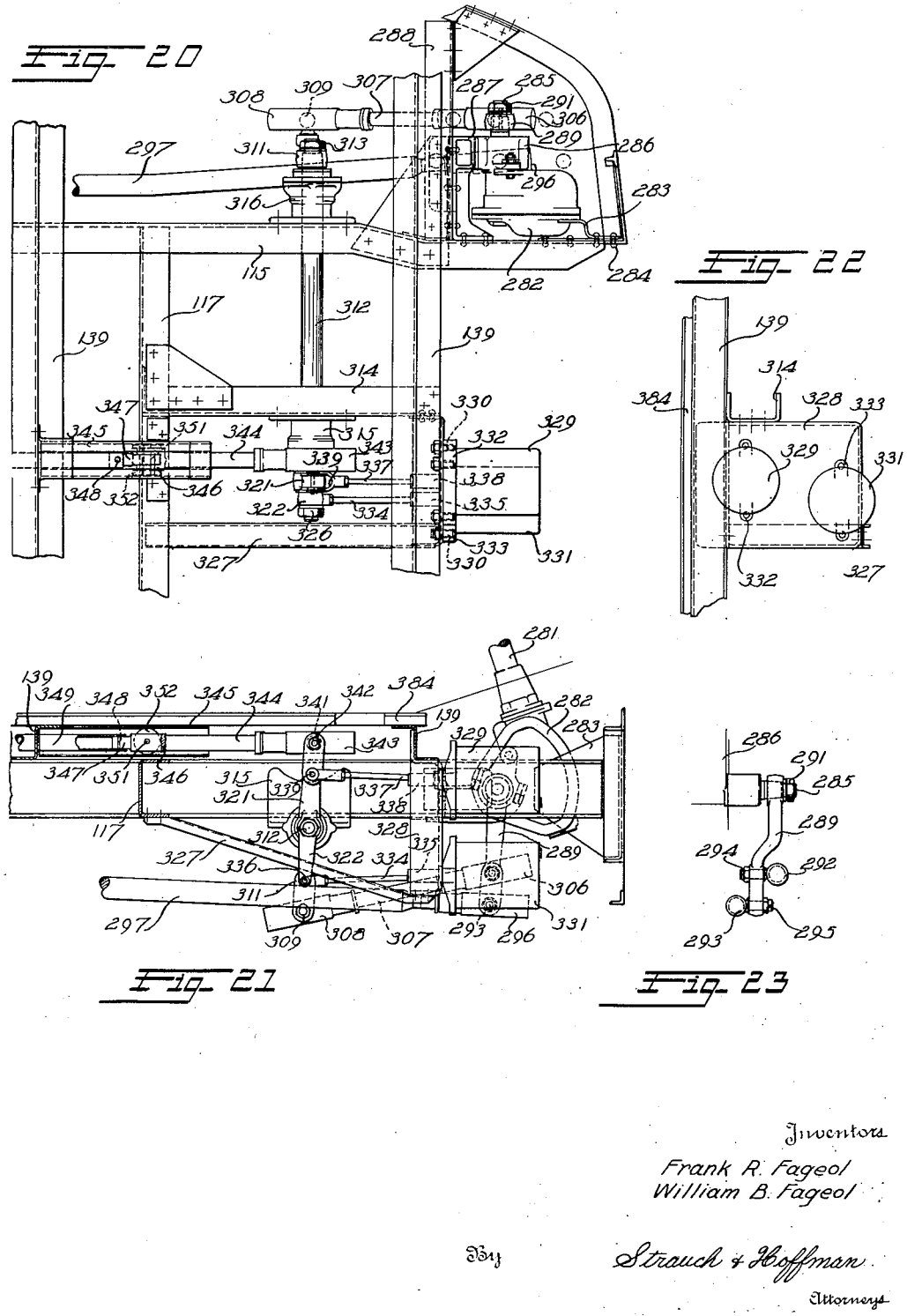

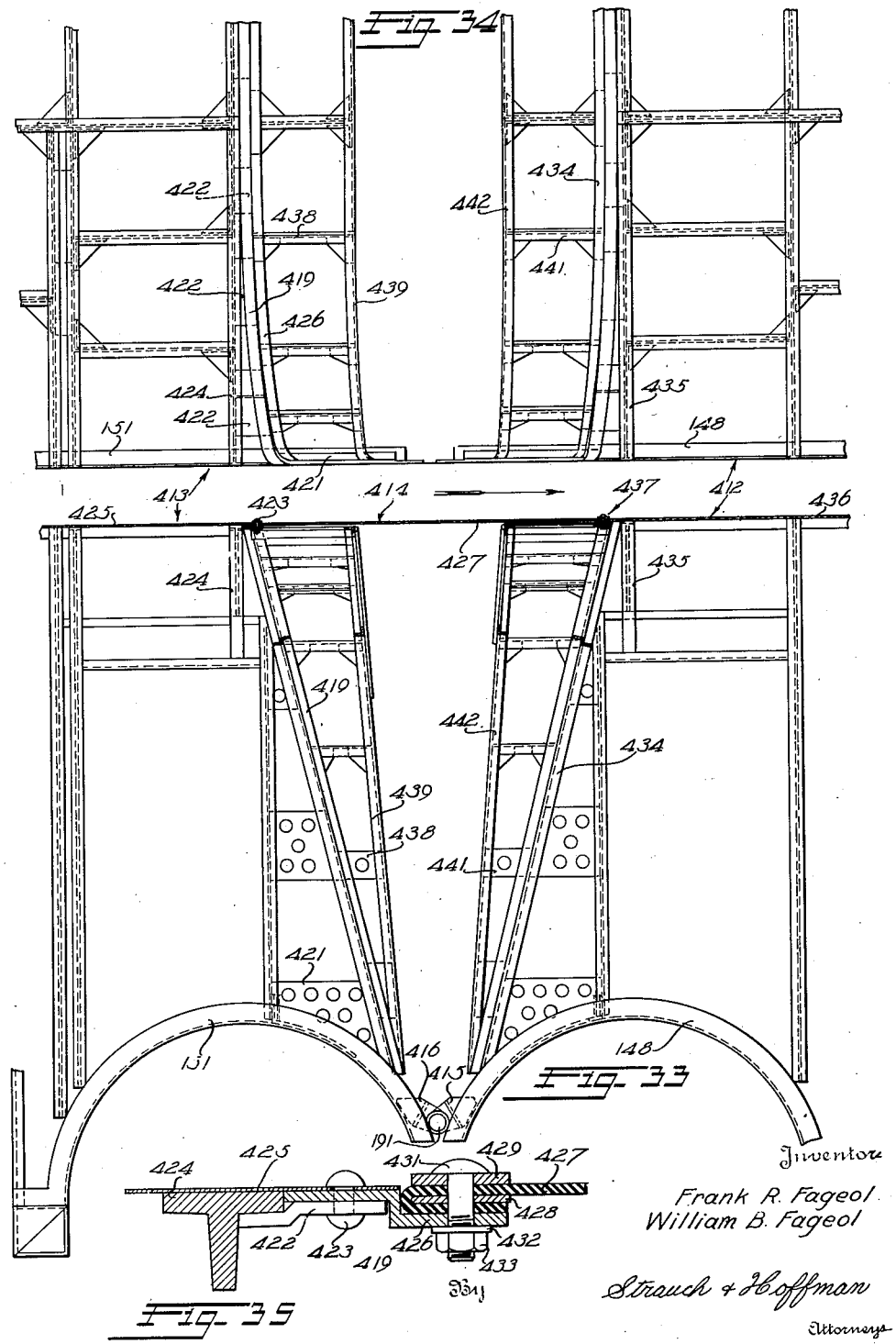

Inventors
Frank R. Fageol
William B. Fageol

UNITED STATES PATENT OFFICE 2,251,584

PASSENGER VEHICLE

Frank R. Fageol and William B. Fageol, Kent, Ohio, assignors to Twin Coach Company, Kent, Ohio, a corporation of Delaware Application May 25, 1938, Serial No. 210,030

17 Claims. (Cl. 280—33)

This invention relates to trackless vehicles and is more particularly concerned with large capacity passenger carrying vehicles for mass transportation.

Street cars, and other mass transportation vehicles which operate on tracks, are now being rapidly replaced by trackless vehicles, such as coaches or buses in many well populated and municipal areas. These coaches are not only more economical in initial cost and operation, but they are much more adaptable to present day traffic conditions and can be routed at will through city streets.

Recent improvements in these coaches have developed them considerably until today they give comfortable, speedy mass transportation which is not ordinarily obtainable in street cars. However, due to congested traffic conditions and the limitations imposed by narrow, rough and poorly designed city streets, most of the coaches now in use, especially in transit systems in well populated areas, have relatively small passenger carrying capacities as compared with the street cars.

In recognition of these disadvantages in prior coaches, it is a major object of this invention to provide a novel trackless passenger carrying vehicle which will accommodate at least approximately as many passengers as the ordinary street car, and which can be maneuvered in substantially the same driving range as the smaller coaches now in general use. In specific attainment of this object, we provide a laterally rigid long vehicle having steering wheels at the front and rear and one or more intermediate drive axle arrangements, which vehicle is articulated or jointed only to insure proper traction.

A further object of this invention is to provide a novel large capacity passenger carrying coach whose body is constructed in sections hinged together so as to be capable of bending or flexing about a horizontal transverse axis, but is maintained rigidly against bending or flexing in any other manner, the arrangement providing space within the bendable body permitting free unobstructed movement of passengers from one end or section of the body to the other. In the specific attainment of this object, we provide a pair of hinged chassis sections for supporting the body which consists in two sections having completely open ends united by a flexible joint disposed above the chassis hinge connection.

A further object of this invention is to provide a novel elongated vehicle having a jointed body through which a substantially continuous passage floor and aisle extends from one end of the vehicle to the other.

It is a further object of this invention to provide novel floor structure in a jointed vehicle body wherein spaced rigid floor portions of the body are permitted to freely move relatively to each other during bending of the body without binding or causing an open space in the floor between the floor portions. In specific attainment of this object, the space between separate rigid floor portions is provided with a strip or strips of suitable resilient material, such as hollow rubber tubing, which will expand or contract to maintain a closed joint between the adjacent edges of the rigid floor portions during all phases of bending of the body.

A further object of this invention is to provide a flexible vehicle chassis having novel hinge arrangements which permit flexure of the chassis about a horizontal transverse axis, but maintain the chassis against flexure in all other directions.

It is a further object of this invention to provide a large capacity sectional passenger carrying coach having novel seating, passage and door arrangements, which are especially designed to permit free movement of passengers from end to end within the body, and in which the driver has an unobstructed view of all of the doors, the through aisle, and the entire space within the several vehicle sections, while he is seated in driving position. To this end, the seats are scientifically arranged to afford wide passage spaces wherever standing passengers tend to accumulate, and the exit door or doors are carefully placed and located centrally with respect to most of the passengers within the body.

A further object of our invention is to provide a novel drive axle spring suspension unit pivoted intermediate the ends of a two-section articulated chassis, the pivot for this spring suspension unit being arranged with its axis in the same vertical plane as the pivotal axis of the chassis.

A still further object of the invention is to provide a vehicle, having an articulated passenger carrying body supported by forwardly and rearwardly disposed dirigible wheels and intermediate driven wheels, the axle or axles carrying the driven wheels being connected to the articulated body by a spring suspension related to the axis of articulation between the body sections in such a way as to maintain maximum traction regardless of the degree of flexure of the body.

This invention also aims to provide a multi-wheel passenger carrying vehicle, including a pair of centrally disposed axles carrying driven wheels and forwardly and rearwardly disposed axles supported by dirigible wheels, in which the pair of intermediate axles are connected together by a spring suspension that is pivoted to the body for swinging movement about an axis disposed in the plane of the axis of articulation of the body, whereby movement of the body sections has no effect upon the distribution of the load on the driven wheels and on the traction obtainable therefrom.

A still further object of the invention is to provide an elongated articulated passenger-carrying vehicle, that is driven by wheels arranged adjacent the axis of articulation of the vehicle body, and that includes mechanism to drive the wheels so related with respect to the axis of articulation of the body that the driving of the wheels is entirely unaffected by relative shifting of the sections of the body with respect to said axis.

A still further object of the invention is to provide an improved passenger carrying vehicle body consisting in two open-ended sections hingedly united at the floor line, and including flexible side wall and roof portions, above the hinged joint, permitting elongation or contraction of the body above said hinge.

This invention also aims to provide a large capacity passenger carrying vehicle consisting, in effect, of two open-ended passenger carrying bodies hingedly connected together for articulated movement about a horizontal axis disposed adjacent the floor line of the bodies, which bodies are supported at the point of articulated connection upon driven axles connected together by a spring suspension secured to the body below the point of articulation, so that the axles may be driven independently by mechanism supported by the several sections without interference upon relative movement of the body sections and the mechanism carried thereby.

A further object of our invention is to provide novel steering arrangements for steering the front and rear wheels supporting separate chassis sections in the vehicles of our invention, power steering controls being preferably used as boosters to aid manual operation of the steering controls.

A further object of our invention is to provide a novel steering linkage for a jointed vehicle. Specifically the steering rod extending to the rear steering wheels is articulated and supported upon roller guide means adjacent opposite ends of the vehicle.

A further object of our invention is to provide a novel articulated chassis in which the separate drive axles of a multi-wheel suspension drive axle unit, pivotally connected to the chassis, are driven from separate motors rigidly secured to the separate relatively movable chassis sections and include a novel torque resisting arrangement between the drive axles and the chassis sections.

Still a further object of this invention is to provide a novel flexible passenger vehicle body having portions of the roof and sides over the axis of articulation constructed of freely yieldable material permitting substantial contraction and expansion of the body longitudinally above the floor line as articulation occurs.

Further objects of our invention will presently appear as the description proceeds in connection with the appended claims and the annexed drawings in which:

Figure 1 is a side elevation of a trackless trolley coach which is flexible intermediate its ends about a transverse axis and provided with a drive axle supporting truck which is pivoted about an axis lying in the same vertical plane as the axis of flexure of the coach;

Figure 2 is a plan view, partly in section and partially diagrammatic, illustrating the seating, passage and door arrangements within the body of the coach of Figure 1;

Figure 3 is a side elevation of an elongated motor coach comprising a further embodiment of our invention wherein a single drive axle whose axis lies in a plane spaced from the axis of flexure of the coach is provided;

Figure 4 is a plan view, in section and partially diagrammatic, illustrating the rear motor drive and the chassis hinges of the coach of Figure 3;

Figure 5 is a side elevation partly in section of another embodiment of our invention with the coach body removed to show the chassis arrangements wherein the multi-wheel drive unit is pivoted about the pivot axis of the chassis sections;

Figure 6 is a top plan view of the chassis of Figure 5 illustrating the gas- or Diesel-electric drive arrangements and the structure of the chassis pivot;

Figure 7 is a side elevation of a vehicle comprising another embodiment of our invention which is flexible about an axis lying in the same vertical plane as the axis of a single drive axle. This vehicle is provided with a forwardly disposed motor and is designed especially for short trips;

Figure 8 is a top plan view, partly in section and partially diagrammatic, of the vehicle of Figure 7 illustrating the seating, passage and drive arrangements;

Figure 9 is a front end elevation of the vehicle of Figure 7 illustrating the outwardly facing seating arrangements;

Figure 10 is an end view partly in section along line 10—10 in Figure 7 and partially diagrammatic, further illustrating the seating and passing arrangements;

Figure 36:
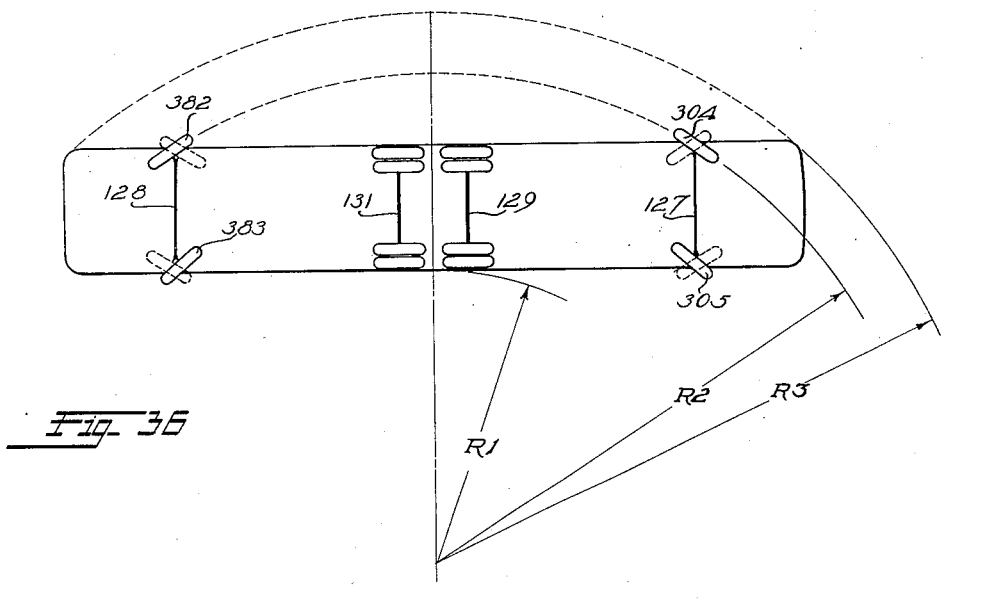
Figure 37:
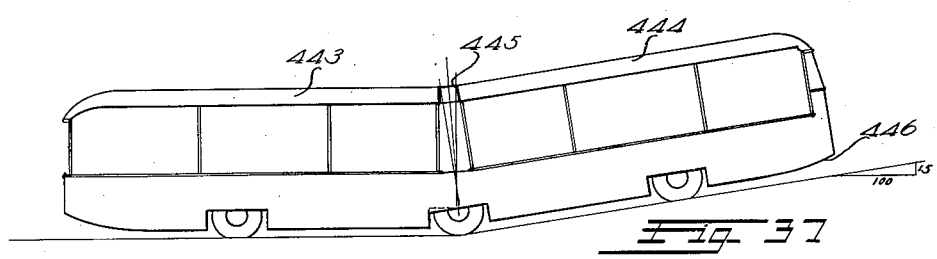
Figure 38:
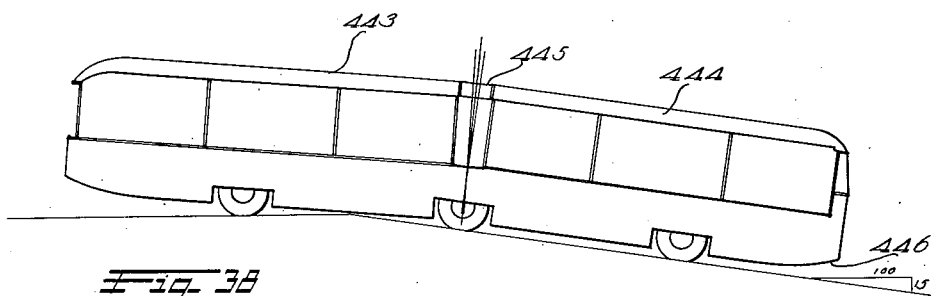

Figures 11, 11A and 11B, joined along lines A—A and B—B, combine to form a plan view of a complete chassis and body base frame construction made according to the principles of the invention;

Figure 12 is a side elevation of a form of chassis hinge used on vehicles of our invention of the design shown in Figure 11, looking from top to bottom in Figure 11;

Figure 13 is a top plan view of the chassis hinge arrangements of Figure 12 and further illustrating the torque members;

Figure 14 is an enlarged top plan view of one of the chassis hinges of Figure 12;

Figure 15 is a side elevation of the chassis hinge of Figure 14 illustrating further the spring and multi-wheel suspension unit pivot;

Figure 16 is a section taken along line 16—16 in Figure 15 illustrating further the chassis and spring suspension pivots;

Figure 17 is a plan view of a portion of a chassis similar to the chassis of Figure 11 and illustrating the steering arrangements;

Figure 18 is a side elevation partly in section further illustrating the steering arrangements shown in Figure 17;

Figure 19 is a section taken along line 19—19 in Figure 17 illustrating the steering rock shaft mounting;

Figure 20 is an enlarged fragmentary plan view of a portion of the front end of the chassis of Figure 19 illustrating further the steering arrangements;

Figure 21 is a side elevation partly in section of the apparatus of Figure 20;

Figure 22 is a fragmentary end view of a portion of the steering mechanism of Figure 20 illustrating especially the steering booster support;

Figure 23 is an end elevation partly in section illustrating the main steering control link at the bottom of the steering post;

Figure 24 is a fragmentary top plan view of one form of flexible joint used in the floor in the body of any of the vehicles of our invention including those illustrated in Figures 1-10;

Figure 25 is a section taken along line 25—25 of Figure 24 illustrating the shape of the resilient floor portion, with the rigid floor portions level;

Figure 26 is a section similar to Figure 25 illustrating expansion of resilient floor members when the rigid floor portions are relatively separated;

Figure 27 is a section similar to Figure 25 illustrating compression of the resilient floor member when the rigid floor portions are relatively moved toward each other during bending of the body;

Figure 28 is a fragmentary top plan view of another form of flexible joint which may be used in the body floor of the vehicles of our invention;

Figure 29 is a section taken along line 29—29 of Figure 28 illustrating the cooperation of the separate resilient members of the joint when the rigid floor sections are level and in normal position;

Figure 30 is a section similar to Figure 29 illustrating expansion of the joint during one phase of relative movement between the joint members;

Figure 31 is a section similar to Figure 29 illustrating compressions of the joint during another phase of relative movement between the joint members;

Figure 32 is a section through a portion of a body floor illustrating another type of hollow resilient joint member which may be used in any of the vehicles of our invention;

Figure 33 is a side elevation illustrating a preferred form of flexible body joint used in vehicles of our invention;

Figure 34 is a plan view of the body joint of Figure 33, only the body frame members being illustrated for the sake of clarity;

Figure 35 is an enlarged section illustrating the manner in which the flexible body section is joined to the rigid body section at either side;

Figure 36 illustrates diagrammatically the steering arrangements of our invention which enable the long vehicle to be turned about a relatively small radius;

Figure 37 illustrates diagrammatically the manner in which the body of a vehicle of our invention bends as it enters an up-grade; and Figure 38 illustrates the vehicle of Figure 37 entering a down grade.

General chassis and body designs

Referring to Figures 1 and 2, the embodiment of the invention there illustrated is a trackless road vehicle or coach of the type which derives its power from overhead trolley wires (not shown) by means of trolley 11 much in the same manner as the conventional street car derives its power from an overhead trolley wire system.

The coach of Figure 1 is made up of separate aligned passenger body sections 12 and 13 interconnected by a flexible body joint generally designated at 14 and later to be described in detail. Body sections 12 and 13 extend entirely along the length of an articulated chassis which is hinged intermediate its ends upon a transverse pivot, generally designated at 15 in Figure 1, in such a manner that the chassis is rigid against lateral flexure but is free to flex about pivot 15 as the contour of the roadway changes. The nature of this chassis pivot will be fully described later. Since the body sections 12 and 13 are rigidly secured to separate hinged chassis sections, the body flexes about the transverse pivot 15 with the separate body sections following the relative movements of the chassis sections.

The chassis is preferably supported by front wheels 16, rear wheels 17 and an intermediate multi-wheel drive suspension unit 18 pivotally connected to the chassis at 19. As shown in Figure 1 the axis of the multi-wheel drive suspension unit 18 preferably lies in the same vertical plane as the axis of the transverse chassis pivot 15. This arrangement distributes the load equally among the wheels of the driving axles. Suspension unit 18 and its connection with the chassis will be described in detail later. Wheels 16 and 17 are arranged upon their respective axles so that they constitute steering wheels and are controlled by steering control 21 in front of the driver's seat 22. Electric motors for driving the wheels of suspension 18 are not shown since they do not constitute part of the present invention.

As shown in Figure 2, the flexible body extends over the wheels; and wheel housings 23, 24 and 25 are provided for housing wheels 16 and 17 and the suspension unit 18, respectively. The body is provided with a front side door 26 and a rearwardly disposed door 27 on the same side. Doors 26 and 27 are preferably entrance and exit doors, respectively, and are located in predetermined positions as will later be described.

Directly above each wheel housing 25 is a floor 29 having a flexible section 30. The opposite ends of floor 29 are secured to separate body sections 12 and 13. A ceiling wall 31 having a flexible section 32 is disposed at ceiling level between the body sections above each floor 29. A storage compartment 33 is built between those body seats which are disposed on opposite sides of the body joint as shown in Figure 2. Suitable panel means 34 prevent passengers from entering the space between those seats. Members 29 and 31 form the bottom and top walls, respectively, of compartments 33. A suitable resilient floor joint, designated at 35 and later to be described in detail, is provided in passage 28 between the rigid floor portions of the separate body sections. The outer walls of compartments 33 are defined by suitable resilient wall portions at joint 14 and will later be described.

Preferred seating arrangements for this type of coach are shown in Figure 2. All of the seats are disposed on opposite sides of the unobstructed through passage 28 which extends through both body sections substantially from one end of the coach to the other. At both ends and at the middle of the body inwardly facing seats 36 are positioned over the several wheel housings which project upwardly within the body. Not only does this arrangement provide sufficient leg room for passengers on seats 36 but these inwardly facing seats project a smaller distance into passage 28 than the longitudinally facing seats 37 and thus provide maximum floor space for standing at those places where standing passengers tend to accumulate in crowded coaches.

At the front door, which is disposed adjacent the driver's seat so that he may collect fares from entering passengers, are steps 38 and 39 leading from the curb level to the floor of passage 28. Rear exit door 27 encloses steps 41 and 42 leading from curb level to the floor of passage 28 and is carefully positioned to be centrally located with respect to the passenger mass in a crowded vehicle. Such an arrangement provides for the speediest possible unloading of passengers.

The driver from his seat 22 has full vision of the entire interior of the coach along the passage 28 so that all of the passengers, the rear wall windows and the rear door 27 can be surveyed quickly from the driver's seat before starting or stopping the vehicle. A suitable mirror (not shown) is usually provided so that the driver need not turn his head while surveying the interior of the coach.

From the above it will be seen that the coach of this invention is provided with a long flexible body having a substantially unobstructed passage for unimpeded movement of passengers from one end to the other. The doors are located for convenient and speedy passenger ingress and exit and wide passage floor spaces are provided at the doors and near the rear of the body where standing passengers tend to accumulate. The coach is especially adaptable for one man operation since the driver has unobstructed vision all along the through passage without moving from his seat.

Before describing the details of preferred body, floor and chassis joints a few optional arrangements of chassis and body combinations will be discussed. Figures 3 and 4 illustrate a motor coach having a motor 43 mounted at the rear end of a chassis 44 and connected to the single driving axle 45 by a suitable propeller shaft 46. Steering axles 47 and 48 are disposed at opposite ends of the chassis and are preferably equally spaced from the intermediate driving axle 45.

Coach body sections 49 and 51 are secured to rigid chassis sections 52 and 53, respectively, which are pivotally connected at 54 (see Figure 3). The axis of pivot 54 is preferably displaced horizontally with respect to the axis of driving axle 45. As shown in Figure 4, chassis sections 52 and 53 are preferably of the same width and are disposed with their longitudinal side members in alignment. Section 52 is provided with a pair of rigid arms 55 and 56 which are secured in any suitable manner along the outer lateral surfaces of the longitudinal chassis members and extend forwardly from chassis section 52. Arms 55 and 56 are provided with apertured lugs 57 and 58 which are aligned with apertured lugs 59 and 61, respectively, secured to the chassis section 53. Suitable aligned pivot assemblies 61 and 62 extend through these apertured lugs so that chassis sections 52 and 53 are free to pivot substantially vertically about rod 62 but are held rigidly against transverse flexure. An intermediate flexible body joint 64, disposed between body sections 49 and 51, allows the body to flex with the chassis.

In Figures 5 and 6, a motor coach having a rearwardly disposed Diesel or gasoline motor 65 drives a generator 66 which supplies power to two electric motors 67 and 68 in driving engagement with dual wheel driving axles 69 and 71. Driving axles 69 and 71 are mounted on a spring suspension 72 which is pivoted to the chassis at 73. Front and rear axles 74 and 75 are provided with common control steering arrangements later to be described.

Front and rear rigid chassis sections 76 and 77, respectively, are connected by a pivot whose axis preferably coincides with axis 73 and lies approximately just below the floor 70 of the through body passage. As shown in Figure 6, the side members of rear chassis section 77 are provided with aligned, bifurcated, apertured lugs 78 and 79 which project forwardly to embrace lugs 81 and 82 secured upon the rear ends of the side members of front chassis section 76.

A suitable pivot rod 83 extends through the apertured lugs in such a manner that chassis sections 76 and 77 are free to flex about a transverse axis at 73 but are held rigidly against lateral flexure. Inwardly of the chassis side members, rod 83 is provided with enlarged cylindrical portions about which fit apertured extensions 84 and 85 of the spring suspension unit 72 in such a manner that the suspension unit is free to rock about rod 83 as a pivot. Rod 83 may be secured to either of the chassis sections while rotatably connected to the other, or may be mounted in suitable bearings on both chassis sections so that a full floating pivot is provided at 73.

Motors 67 and 68 are rigidly fastened to the rear and front chassis sections 77 and 76, respectively, and are connected by suitable wiring to generator 66.

In Figures 7-10 is illustrated a motor vehicle especially designed for carrying large numbers of passengers for short trips along crowded roads extending through sight-seeing areas such as world's fairs and the like. This type of vehicle is provided with outwardly facing seats 86 flanked by foot platforms 80 and is designed to run between passenger platform stations on the crowded roadway, the passengers paying a fare before entering the platform. The passenger platforms may be on both sides of the vehicle for speedy transfer of passengers; and for this reason, a plurality of side doors 87, each provided with a low step 88 at platform level, are provided at each side of the vehicle. Suitable side rail sections 89 extend between each door. The doors 87 and rail sections 89 may be of any suitable construction such as wire mesh extending between pipe frames. Doors 87 are located centrally with respect to passenger mass just as in all of the other vehicles of the invention.

As shown in Figures 7 and 9 the driver's seat 91 is located upon a floor 92 which is much higher than the through body floor 93. This enables the seated driver full vision over the heads of passengers inside the vehicle all along through passage 93 and enables him to drive with safety through streets crowded with pedestrians since he can see the road directly in front of him and also over the heads of the pedestrians. The passenger seats are disposed at a level so that the seated passengers have full vision over the heads of pedestrians in the roadways. The roof level is preferably high enough to permit passengers standing in aisle 93 full vision along the roadway.

The body is made up of rigid sections 94 and 95 interconnected by a flexible body joint 96 of the type later to be described. Body sections 94 and 95 are preferably made up of light structural members and are secured upon rigid chassis sections 97 and 98, respectively. As shown in Figure 8 the side members of chassis section 97 are spaced further apart than the side members of chassis section 98 and extend forwardly to embrace the latter. The side members of chassis section 97 are provided with upstanding apertured lugs 99 and 101 which register with upstanding apertured lugs 102 and 103 on chassis section 98. Suitable aligned pivot pin assemblies 104 and 105 are provided for each pair of apertured lugs so that chassis sections 97 and 98 are pivotally connected for relative movement about a transverse axis but are rigidly maintained against lateral flexure.

Chassis section 98 extends rearwardly and downwardly at 106 to support one end of a spring 107 whose other end is also supported on chassis section 98. Spring 107 is supported on a dual wheel driving axle 108 which is connected by propeller shaft 109 to a forwardly disposed motor 111 directly under the driver's seat. The axis of axle 108 is spaced vertically from the chassis pivot axis but lies in the same vertical plane therewith. It will be seen that body section 95 and chassis sections 98 comprise a complete coach unit which would be operable as a small capacity vehicle if the vehicle of Figure 7 were separated at joint 96 and the chassis pivot. In fact, it is entirely within the scope of our invention to provide a detachable joint at 96 in such a vehicle.

Front and rear steering axles 112 and 113, preferably equally spaced from driving axle 108, are provided beneath the front and rear chassis sections, respectively.

Each body section 94, 95 is preferably open all along the outer sides thereof with the exception of a few narrow roof supports 114 and provides unobstructed vision for passengers seated in seats 86 or standing in aisle 93.

From the above it will be seen that the invention is freely applicable to practically all types and designs of passenger carrying road vehicles. Any type of motive power may be used such as gasoline, gas- or Diesel-electric, straight electric, Diesel or the like. The intermediate drive unit may be of the dual axle multi-wheel type or may be of single axle design depending on the size and service required. Where a multi-wheel drive unit is used, this unit is preferably suspended about an axis lying in the same vertical plane as the chassis pivot axis but this is not essential and the multi-wheel suspension may be spaced longitudinally of the chassis pivot as desired. Use of multi-wheel suspension units increases the braking power because proportionately more ground engaging wheel surface is provided than in the conventional rigid coach. It is advisable for satisfactory operation, however, to locate the flexible body joint substantially directly above the chassis pivot axis.

Preferred chassis and body base frame construction

Figures 11A, 11 and 11B joined along lines A—A and B—B cooperate to illustrate a complete chassis and body base frame designed to carry out the invention as applied to a passenger vehicle of the type employing a motor and generator combination at the rear and individual electric drive motors at each drive axle.

The chassis comprises a front section having a pair of longitudinal frame members 115 and 116 interconnected by a plurality of transverse chassis members 117 and a rear section having a pair of longitudinal frame members 118 and 119 interconnected by transverse chassis members 121. Frame members 115 and 118 are provided with aligned apertured extensions 122 and 123 at one side of the frame and frame members 116 and 119 are provided with similar aligned apertured extensions 124 and 125 at the other side of the frame. A pivot member 126 extends through the aligned apertures in extensions 122, 123, 124 and 125. The details of this chassis pivot will be set forth later.

The chassis is supported by front and rear axles 127 and 128, each provided with steering wheels, and intermediate drive axles 129 and 131 which are mounted on a spring suspension 132 pivoted to the frame at 133 (Figure 12) as will be later explained. Electric motors 134 and 135 are securely mounted on the front and rear chassis sections, respectively, and are connected by suitable universally jointed propeller shafts to drive axles 129 and 131. Power plant means (not shown) for supplying power to motors 134 and 135 are mounted upon platform 136 at the rear end of the chassis. Suitable torque rods, later to be described, are provided for overcoming braking and driving torque at the drive axles.

The body base frame is supported directly upon the chassis and comprises a front section having longitudinal frame members 137 and 138 which are interconnected by lateral members 139 and a rear section comprising longitudinal frame members 141 and 142 interconnected by lateral members 143. Lateral members 139 and 143 are secured to their respective longitudinal chassis members by any suitable means such as bolts, rivets or the like.

Longitudinal body members 137 and 138 are provided with upwardly arched portions 144 and 145, respectively, to extend over the wheels on front axle 127. Similar arched frame portions 146 and 147 are provided on frame members 141 and 142, respectively, to extend over the wheels on rear axle 128. The rear ends of members 137 and 138 are provided with arched portions 148 and 149 extending over the wheels on axle 129. The front ends of members 141 and 142 are provided with arched portions 151 and 152 extending over the wheels on axle 131. The above described arched portions may be integral with the longitudinal base frame members or may be rigidly secured thereto as by rivets.

The free ends of arched portions 148 and 151 are pivotally connected at one end of pivot 126 while the free ends of arched portions 149 and 152 are pivotally connected at the other end of pivot 126. Details of this connection will be given later.

Chassis pivot construction

With reference to Figure 12 which illustrates the chassis pivot as viewed from the top of Figure 11, frame extension 122 is secured rigidly to the outer lateral side of longitudinal chassis member 115 and to transverse chassis member 150 at the rear end of the front chassis section by bolts 153 or in some other suitable manner. A suitable reenforcing web 160 is bolted to the corner formed by members 150 and 115. Extension 122 is provided with a laterally outwardly extending bearing member 154 embracing the hollow pivot rod 126. As shown in Figures 14, 15 and 16, bearing member 154 is provided with a removable bearing cap portion 155 having lateral flanges 156 and 157 which mate with lateral flanges 158 and 159, respectively, on member 154. A plurality of suitable bolt and lock nut assemblies 161 extend between flanges 156 and 158 and a plurality of similar bolt and lock nut assemblies 162 extend between flanges 157 and 158 to firmly secure cap 155 upon member 154.

A suitable bearing means is provided between member 154 and cap 155 and the enclosed pivot rod 126. Rod 126 is preferably a hollow steel rod which has been hardened and ground to precise dimensions. As shown by Figure 16, suitable bearing liners 163 and 164 are secured within members 154 and 155, respectively, and fit over the periphery of rod 126 in such a manner that, with cap 155 secured in place, chassis member 115 is rotatably connected in bearing engagement with rod 126. If desired, roller or needle bearings or any other similar bearings may be used between extension 122 and rod 126.

The outer edge of bearing member 154 is preferably machined to provide a flat surface against which lies a suitable end thrust bearing assembly 165 rotatably mounted on rod 126. Beyond bearing 165, rod 126 is externally threaded at 166 to receive a suitable lock nut and washer assembly 167 which maintains the bearing members in axial position on rod 126.

Inwardly of bearing member 154 a second thrust bearing 168 is rotatably disposed upon rod 126 between the machined end surfaces of bosses 169 and 171 on member 154 and a rod supporting member 170, respectively. Member 170 is preferably an integral part of extension 123. Extension 123 is secured to longitudinal chassis member 118 by bolts 173 or the like and is provided with an inwardly and downwardly extending integral web 174 secured as by bolts to the end transverse member 175 of the chassis rear section. A second integral web 176 extends from extension 123 between the top surface of member 175 and the bottom surface of member 118 and is rigidly secured thereto by bolts or rivets designated at 177.

Member 170 is provided with a removable cap portion 178 having lateral flanges 179 and 181 which mate with flanges 182 and 183 on member 170. A plurality of suitable bolt and lock nut assemblies 184 extend between flanges 179 and 182 and a plurality of similar bolt and lock nut assemblies 185 extend between flanges 181 and 183. With reference to Figure 16, cap 178 is provided with a keyway 186 within which fits a key 187 which also projects into a cooperating keyway 188 formed on the surface of rod 126. When bolts 184 and 185 are drawn tight, extension 123 is rigidly and non-rotatably secured to rod 126. Friction between the adjacent edges of extensions 122 and 123 is reduced to a minimum by thrust bearing 168.

The pivot joint between frame extensions 124 and 125 at the other side of the chassis is preferably identical with the above described pivot joint between frame extensions 122 and 123, with extension 124 being rotatably journaled on the opposite side of rod 126 and extension 125 being non-rotatably secured to rod 126, and such will not be described in detail.

At opposite sides of the chassis, rod 126 is provided with projecting end portions 189 and 191 of reduced diameter to form pivot connections for the rigid body sections as will be later described.

From the above it will be seen that we have provided a chassis section pivot connection which permits free relative oscillation of the chassis sections about the axis of rod 126 but is strong and rigid laterally to prevent transverse flexure of the chassis. This resistance to lateral flexure is assisted materially by the provision of large end thrust bearing areas at bearing 168. While the above form of chassis joint has been found to be very well adapted for purposes of the invention, it will be understood that the invention is not at all restricted to the illustrated structure.

Multi-wheel drive suspension unit

With reference to Figures 12, 15 and 16, cap member 178 is provided with a downwardly and inwardly extending integral ribbed hanger portion 192 having its lower end portion formed at 193 to fit about a transverse shaft 194 whose axis is parallel to that of rod 126 and lies in the same vertical plane. A cap member 195 also extends about shaft 194 and is provided with suitable lateral flanges which mate with cooperating apertured lateral flanges on hanger portion 193.

Shaft 194 is provided with a keyway 205 for receiving a key 206 which also projects into a cooperating keyway 207 in the hanger end portion 193. Cap 195 and hanger end 193 are secured together about shaft 194 in exactly the same manner as member 170 and cap 178 above described are secured together about rod 126 so that rod 126 and shaft 194 are both non-rotatably connected to hanger 192.

Laterally beyond hanger 192, shaft 194 which is preferably of hardened steel is provided with a bearing portion 208 which is preferably machined or ground to a predetermined size.

A spring support block 209 is designed at its upper end to fit about shaft portion 208 and is provided with lateral flanges 196 and 197 which mate with cooperating lateral flanges 198 and 199 integral with a suitable bearing cap member 209' which also fits about shaft portion 208 above block 209. Flanges 196 and 197 are provided with tapped holes 201 and 202 and suitable cap screw and lock washer assemblies 203 and 204 extend through the apertures in flanges 198 and 199 into holes 201 and 202, respectively.

Block 209 and cap 209' are provided with suitable bearing liner assemblies 211 and 211', respectively, so that when screws 203 and 204 are tightened, block 209 is rotatably journaled on shaft portion 208.

An end thrust bearing 212 is rotatably mounted on shaft portion 208 between the machined end faces of hanger 193 and block 209. A second end thrust bearing 213 is rotatably mounted on shaft portion 208 and held against the machined outer face of block 209 by a suitable lock nut assembly designated at 214 and mounted upon the threaded end portion 215 of shaft 194.

A spring 216 of suitable strength is provided with a seat or saddle 217 engaging the central portion of the bottom spring leaf. Block 209 is provided with depending apertured side flanges 218 and 219 which embrace opposite sides of spring 216. A plurality of stud bolts 221 and 222 extend upwardly through apertured lugs 210 and 220 on opposite sides of saddle 17 to be received within tapped holes 223 and 224 in lugs 25 and 226, respectively, at the bottom of block 209. Opposite flanges 218 and 219 are each provided with aligned depending apertured lugs 227 and 228 which abut opposite lugs 210 and 220 and between which extend lateral bolt assemblies 229 and 231 for securing the spring elements against lateral displacement.

The opposite ends of spring 216 rest on hardened steel spring pads 232 and 233 secured as by welding to the spring end support brackets 234 and 235. Bracket 235 is rigidly secured to the axle housing 129 by means of bolts 236 and 237 which pass through suitable integral lug formations 238 and 239 on opposite sides of the axle housing and through suitable aligned apertures in bracket 235. Suitable lock washer and nut assemblies at 241 and 242 are provided at the lower end of bolts 236 and 237 and tightening of nuts 241 and 242 rigidly secures bracket 235 to the axle housing 129.

The forward end of bracket 235 is provided with an integral boss 243 having a tapered aperture for receiving rotatably a tapered pin 244 projecting from a rubber bushing (not shown) inside of boss 245 at one end of a torque rod 246. Suitable nut and cotter key arrangements at opposite ends of pin 244 prevent the pin from axial displacement with respect to bosses 243 and 245. The front end of rod 246 is provided with a boss 247, similar to boss 245, from which projects a tapered pin 248 fitting rotatably within a hollow boss 249 formed at the lower end of a depending frame bracket 251. Bracket 251 is secured rigidly to frame member 115 by bolts 252 or the like.

The opposite end of spring 216 seats in bracket 234 which is rigidly secured to axle housing 131 by a plurality of bolts 253 and 254 passing through the bracket and lug formations 255 and 256 on opposite sides of the axle housing. Bracket 234 is provided with a hollow boss 257 for rotatably receiving a tapered pin 258 mounted in a boss 259 at the forward end of torque rod 261. Torque rod 261 is pivotally connected to a frame bracket similar to bracket 251 but depending from frame member 118.

A spring 262 (see Figure 11) similar to spring 216 is suspended below the chassis hinge members 124, 125 at the opposite side of the frame and this spring 262 is mounted in the same manner as spring 216 above described. Torque rods 263 and 264, identical with and parallel to torque rods 246 and 261, respectively, are provided on the same side of the frame as spring 262.

Referring to Figures 12 and 13 the housing of axle 129 is provided intermediate the spring ends with an arm 265 which is secured to the top surface thereof by a plurality of bolts 266 or the like. Arm 265 is provided with a hollow boss 267 designed to rotatably receive a tapered pin 268 extending laterally from boss 269 at the rear end of a torque rod 271. The front end of torque rod 271 is provided with a boss 272 from which extends a tapered pin 273. A bracket 274 secured to transverse frame member 117 by bolts 275 and the like is provided with a hollow boss 276 designed to rotatably receive tapered pin 273. A similar torque rod 277 extends between an arm 278 secured to the housing of axle 131 and a transverse chassis member 121. Rods 271 and 277 are disposed parallel to rods 246 and 261, respectively.

The above described parallel torque rod assembly prevents rotation of the axle housings about the axis of the axles therein and furthermore transmits directly to the frame the torquing forces set up in the multi-wheel suspension during braking and driving and when the vehicle is being driven over an irregular roadway. It is to be understood, however, that the invention is not limited to the above described design of torque resisting elements and any suitable arrangement for resisting torques in the suspension 132 may be used.

From the above it will be seen that the drive axles at 129 and 131 are connected to the chassis by a spring suspension 132 which is free to oscillate about the axis of shaft 194. The parallel torque rod sets 246, 263, 271 and 261, 264, 277 are each connected to a separate drive axle and a separate section of the pivoted chassis so that they do not interfere with the action of the chassis pivot. Of course, the whole suspension 132 could be connected to either of the front or rear chassis sections alone but the above described arrangement has been found to be very satisfactory in practical use since it distributes the load evenly upon the wheels during all conditions of operation of the vehicle.

*Steering arrangements*

The chassis illustrated in Figures 17 and 18 is substantially the same as the chassis of Figure 11 except that in Figure 17 the rear chassis section is journaled on rod 126 at 122' while the front chassis section is rigidly secured to rod 126 at 123'. Members 122' and 123' are quite similar to members 122 and 123 above described and will not be here described in detail.

The driver's steering control wheel 279 (Figure 11B) is secured to a control shaft (not shown) extending through steering post 281 (Figure 18) into housing 282. Housing 282 is rigidly supported upon a bracket 283 riveted or otherwise suitably secured to the forward end of the left-hand longitudinal frame member 115 at 284. Housing 282 contains a conventional worm and reduction gear assembly for causing rotation of a stub shaft 285 which extends from housing 282 through a bearing support 286. Bearing support 286 is mounted upon a bracket 287 securely bolted to a transverse channel member 288 which in turn is rigidly secured at its inner end to chassis member 115.

A depending link 289 (Figure 23) is non-rotatably secured upon shaft 285 and is maintained against axial movement thereon, by a suitable lock nut arrangement 291. At its lower end link 289 is provided with a pair of vertically spaced apertures for receiving the shanks of ball headed pins 292 and 293. The ball heads of pins 292 and 293 are disposed on opposite sides of link 289 and the shanks of pins 292 and 293 are threaded where they project beyond the opposite sides of link 298 to receive suitable lock nut assemblies 294 and 295, respectively. Pins 292 and 293 are rigidly and non-rotatably secured to link 289 by the above described design.

The ball head of pin 293 which extends toward the interior of the chassis fits cooperatively within a socket 296 at the forward end of steering link 297. Link 297 is pivotally connected by a ball and socket joint at 298 to an arm 299 rigidly interconnected with the king pin assembly 301 which carries a ground engaging wheel, 304 in Figure 11B, and is pivotally mounted upon one end of the front axle 127. King pin assembly 301 is also provided with a rigid knuckle 302 to which is pivotally connected one end of a drag link 303. Drag link 303 extends transversely of the chassis to the other end of axle 127 where it is pivotally connected to a second knuckle (not shown) upon a king pin assembly similar to that at 301.

When the steering control wheel 279 is rotated in a clockwise direction in Figure 11 to cause rotation of stub shaft 285, link 289 is rocked and acts through link 297, arm 299, king pin assembly 301, knuckle 302, drag link 303 and the steering knuckle and king pin assembly at the opposite side of axle 127 to cause turning of the front wheels 304 and 305 (Figure 11) in a clockwise direction.

The ball head of pin 292 which extends toward the exterior of the body fits within a socket 306 at the forward end of a link 307 which has a similar socket 308 at its rear end fitting over the ball head of pin 309 non-rotatably secured adjacent the lower end of depending link 311. Link 311 (see Figures 19 and 20) is non-rotatably secured upon one end of a steering cross shaft 312 and held against axial movement thereon by a suitable lock nut assembly 313 which is disposed on the outer threaded end of shaft 312.

An intermediate longitudinal channel-shaped chassis member 314 extends between the forward-most transverse chassis member 117 and the forward-most body base frame transverse member 139. A pair of aligned depending bearing brackets 315 and 316 are rigidly secured to members 314 and 115, respectively, as by welding or the like. Brackets 315 and 316 are provided with suitable roller bearing assemblies 317 and 318, respectively, for rotatably supporting cross shaft 312 as shown in Figure 19.

At its inner end, shaft 312 is provided with a tapered portion 319 upon which an upstanding arm 321 is non-rotatably secured as by a force fit. A downwardly extending arm 322 spaced by a washer 323 from arm 321 is non-rotatably secured as by a key and groove arrangement at 324 upon the reduced inner end 325 of shaft 312. A suitable lock nut assembly 326 maintains arm 322 against axial movement along shaft end 325.

Inwardly of member 314, member 117 has secured thereto one end of a support arm 327 whose other end is secured to the bottom end of a brake booster cylinder support bracket 328. The upper end of bracket 328 is suitably secured as by rivets, welding or the like to the lower end of base frame member 139. Two vertically spaced fluid pressure cylinders 329 and 331 are rigidly secured upon bracket 328, as by bolts 330 passing through flanges 332 and 333. A piston rod 34 extends from a suitable crosshead 335 at lower cylinder 331 into pivotal engagement with arm 322 at 336. A second piston rod 337 extends rearwardly from a suitable crosshead 338 at upper cylinder 329 into pivotal engagement with arm 321 at 339.

Above pivot 339, arm 321 is provided with a ball headed stud 341 secured non-rotatably thereto by a lock nut 342. The ball head of stud 341 fits within a socket 343 upon the forward end of a longitudinally extending steering rod section 344 which extends toward the steering mechanism at the rear axle 128 and is disposed substantially centrally longitudinally of the chassis. One of the intermediate base frame transverse members 139 adjacent the front end of the front body section has secured thereto a tubular guideway 345 which is also secured to the top of chassis member 117 for supporting and guiding the front end of rod 344. Within guideway 345, rod 344 is provided with a bifurcated end portion 346 which embraces one end of a link 347 whose other end is pivotally connected at 348 to the front end of a second steering rod section 349. Pivot pin 351, extending through portion 346 and link 347, has mounted thereupon a pair of rollers 352 whose peripheries engage and move along the inner surface of guideway 345.

Pivots 348 and 351 are disposed normally to each other to provide a universal joint in the steering rod within guideway 345 and the steering rod is supported upon rollers 352 within guideway 345 so that it is slidably guided at all times.

Steering rod 349 is bent upwardly at 353 to clear axle 127 and passes through suitable apertures in body members 139 and 143 as it extends along the body sections. In order to allow passage of rod 349 the chassis pivot rod 126 is divided into two aligned sections (Figure 17) interconnected rigidly by a substantially U-shaped element 354 which depends a substantial distance below the axis of rod 126. Rod 349 is provided with a suitable universal joint portion 355 which is disposed between rod sections 126 and whose horizontal axis coincides with the chassis pivot axis. Rod 349 extends along the rear chassis section and is supported adjacent its rear end within a tubular guideway 356 similar to guideway 345 and secured between the body frame base members 143. Within guideway 356, rod 349 is pivotally connected at 360 to one end of a link 357 whose other end is connected to a pivot 358 having rollers 359 for engaging the inner surface of guideway 356.

A third steering rod section 361 extends rearwardly from its pivot at 358 and terminates in a socket 362 within which fits a ball 363 secured to one end of an arm 364 non-rotatably mounted upon a vertical pivot pin 365. Pin 365 is journaled in suitable roller bearings 366 disposed within a bracket 367 which is rigidly supported upon an intermediate longitudinal chassis member 368. A second arm 369, extending normally to arm 364, is non-rotatably secured to the lower end of pin 365 and is provided at its outer end with a downwardly extending ball headed projection 371. The ball head of projection 371 fits within a socket 372 at one end of a transverse link 373 whose other end is provided with a socket 374 fitting over a ball headed projection 375 extending upwardly from an arm 376. Arm 376 is provided with a split collar portion by which it is non-rotatably clamped to the drag link 377 of the rear axle 128 by means of bolts 378 or the like. Drag link 377 is pivotally connected at opposite ends to steering knuckles 379 which in turn are secured to king pin assemblies 381 by which rear wheels 382 and 383 are rotatably connected with axle 128.

When steering control wheel 279 is turned in a clockwise direction, as described above in reciting the steering operation of the front wheels, rocking link 289 acts through link 307, link 311, rock shaft 312, arm 321, steering rod sections 344, 349 and 361, arm 364, pivot pin 365, arm 369, link 373, arm 376, drag link 377, knuckles 379 and king pin assemblies 381 to turn rear wheels 382 and 383 in a counter-clockwise direction opposite to the direction of turning of front wheels 304 and 305. The geometry of this steering arrangement will be discussed later with reference to Figure 36. The long sectional steering rod is universally jointed at 355 in the chassis pivot axis to prevent undue elongation of the steering rod due to flexing of the chassis about the pivot axis.

The steering booster arrangement above described is auxiliary only to the manual control at 279 so that the operator would have full control of the vehicle in case the supply of compressed air or other fluid should suddenly be exhausted. Cylinders 329 and 331 are preferably air pressure cylinders within which are pistons connected to piston rods 337 and 334, respectively. Piston rods 337 and 334 are pivotally connected to arms 321 and 322, respectively, which are secured to rock shaft 312 and extend in opposite directions therefrom. The controls for admitting air under pressure to these cylinders may be a pair of manually operable valves available to the driver's left foot or may be a pair of valves connected to the steering control in such a manner that rotation of the steering control wheel in opposite directions by the driver automatically actuates a different valve to energize that cylinder which will act upon rock shaft 312 to assist the manual control at 279.

*Body floor joint*

With reference to Figure 18 it will be seen that the front body section floor 384 and the rear body section floor 385 are rigidly secured to and supported upon the upper horizontal flanges of transverse body base frame members 139 and 143, respectively. Floors 384 and 385 lie in substantially the same plane and preferably are substantially of the same thickness, and are provided with an interconnecting expansible joint 386 which extends transversely of the body above the chassis pivot axis. Floors 384 and 385 (see Figure 12) are provided with shallow raised portions 387 and 388 above the differential housings to permit free movement of the multi-wheel suspension about its pivot.

As shown in Figure 16, floor 384 is cut away at each corner at 389 adjacent the flexible body joint to clear the chassis pivot structure. Floor 385 is similarly cut away at each corner adjacent the chassis pivot extensions for the same reason. Floor 384 is provided with a centrally disposed floor covering 391 of some wear resistant material or composition while floor 385 (see Figure 25) is provided with a similar covering 392. Floor coverings 391 and 392 extend the full length of the respective body sections. At each side of covering 391, floor 384 has secured thereto one end of a sheet of flexible material 393. The other end of each sheet 393 is similarly secured to floor 385. Each sheet 393 also extends from an inwardly turned lip 394 at the bottom of an inner body panel 395 to the edge of floor covering 391 so that it completely covers the cut-away portions at the adjacent floor corners. This construction is substantially the same at each adjacent floor corner. Body panel 395 is also provided with an elongated lip 396 engaging the lower surface of floor 384 beyond the cut-out portions 389.

With reference to Figure 25, the adjacent edges of floors 384 and 385 are sheathed with channel-shaped strips of sheet metal 397 and 398, respectively, between which is disposed a long narrow transversely extending strip 399 of some flexible or resilient material such as rubber. Strip 399 is preferably a hollow rubber tubular member provided at opposite sides with a plurality of projecting ridges or tangs 401 which engage strips 397 and 398. Preferably, ridges 401 are secured at their outer ends by vulcanization or in some other suitable manner to strips 397 and 398. Additional securing means for resilient strip 399 are provided in the form of substantially rigid projecting strips 402 and 403 which are secured as by welding to strips 397 and 398, respectively, below the floor level and have their projecting edges formed to interlock with suitable groove formations in resilient strip 399.

If desired, the whole joint assembly comprising strips 397 and 398, resilient member 399, projecting strips 402 and 403 may be permanently united before assembly on the floor sections.

With the floor sections level as shown in Figure 25, strip 399 is compressed between the adjacent floor edges which are preferably spaced apart slightly less than an inch in the disclosed embodiment of the invention. Since the floor joint is spaced above the chassis pivot, relative movement of the chassis sections will cause either expansion or further compression of strip 399, the chassis pivot axis being the axis about which the body floor sections oscillate. Strip 399 is shown in expanded condition in Figure 26 and compressed in Figure 27. The hollow portion 404 of strip 399 is suitably designed to enable strip 399 to be compressed to about half its expanded width without binding.

The design of strip 399 is such that, during compression, the material thereof is displaced mostly into the hollow portion 404 and does not form a ridge or obstruction of any appreciable size transversely of the passage from one end of the coach to the other. Similarly strip 399 is further designed so that it will not cause a depression of any appreciable size transversely of the passage from one end of the coach to the other when the body sections are so relatively displaced as to permit full expansion of strip 399. It will be seen, therefore, that the flexible body joint of the invention provides a substantially unobstructed floor for free passage of passengers from one body section to the other body section inside the coach. For practical use it has been found satisfactory to design the flexible body joints for a maximum grade of about fifteen per cent and the relative tilt of the floor sections even during maximum grade conditions is hardly perceptible to passengers inside the coach.

Another embodiment of the expansible floor joint of my invention is illustrated in Figures 28 to 31. Here transverse strips 405 and 406 of split rubber or rubber and fabric tubing, generally U-shaped in cross-section, embrace the adjacent edges of floor portions 384 and 385, respectively, in such a manner as to provide hollow deformable projections upon the adjacent floor edges. Strips 405 and 406 are secured to the respective floors in any suitable manner but preferably sheet metal strips 407 and 408 extend along the top and bottom legs, respectively, of each resilient strip coextensively therewith and suitable screws or other fastening means are provided between rim strips 407 and 408 and the respective floors for anchoring resilient strips 405 and 406 in position.

With the floor sections aligned as in Figure 29 each strip 405 and 406 is slightly deformed and presents a substantially unbroken floor line from flooring 391 to flooring 392. Figures 30 and 31 represent the floor joint members in conditions of substantially maximum expansion and compression, respectively, and it will be seen that no appreciable change in the floor line is caused in either case.

The expansible floor joint shown in Figure 32 is similar to that shown in Figure 25, and comprises a hollow rubber tubular member 409 having oppositely extending ridges 411 which are preferably secured to sheathing strips 396 and 397. Projecting strips 402' and 403', similar to strips 402 and 403 in Figure 21, are provided with suitably formed edges for interlocking with groove formations at the bottom of member 409.

All of the above described embodiments of the flexible floor joint of the invention are designed to provide a substantially unobstructed uninterrupted floor for passage from one body section of the coach to the other. Since these flexible joint members extend between the floor sections in all conditions of distortion, they effectively seal the floor joint against dust, cold air and moisture and prevent small articles such as dropped coins or the like from falling to the ground between the body sections.

*Flexible body section*

With reference to Figures 33 to 35, the opposite rigid body sections 412 and 413, respectively, are interconnected by a flexible body section generally designated at 414. Only the skeleton body work, which is preferably made of light metal structural members, has been shown in these figures for the sake of simplicity. Each body section 412 and 413 is rigidly secured to its respective supporting chassis section. As shown in Figure 33, wheel housings 151 and 148 are provided with projecting lugs 415 and 416, respectively. These lugs may be made integral with the wheel housings or may be rigidly secured thereto by bolt, rivets, welding or the like. Each lug 415 and 416 is apertured to fit over the projecting end portion 191 of chassis pivot rod 126 in rotatable engagement therewith so that as the chassis sections oscillate about rod 126, the body sections supported thereby will be guided to oscillate about exactly the same pivot axis.

Wheel housings 152 and 149 on the other side of the body are provided with similar lugs 417 and 418 which fit rotatably upon the projecting end 189 of rod 126. If desired, lugs 416 and 418 may be secured non-rotatably to rod 126 since the rear chassis section is similarly connected at the pivot axis. The free ends of rod portions 189 and 191 preferably terminate almost flush with the outer side body walls and are provided with suitable locking means for preventing axial movement of the lugs along the rod.

The main frame of body section 413 terminates in a substantially U-shaped angle member 419 which is secured at opposite ends to wheel housings 151 and 152 by suitable means such as reenforcing webs 421. Frame member 419 is inclined rearwardly and is secured at its top portion to a plurality of tabs 422 by suitable fastening means such as rivets 423 (see Figure 35). Tabs 422 are secured as by welding to a transverse roof brace angle 424. Rivets 423 also serve as a securing means for the front end of the sheet metal roof plate 425 of the rear body section. Plate 425 is preferably welded to roof brace 424 to provide a fluid tight joint at this point.

Angle member 419 is provided with a forwardly extending substantially horizontal lip 426 whose outer surface serves as a seat for one end of a flexible sheet 427 extending between the body sections. As shown in Figure 35, the rear edge sheet 427 is doubled about a flat metal reenforcing strip 428 and is provided with a second reenforcing strip 429 engaging its outer surface. Sheet 427 extends from wheel housing 151 along angle member 419 to housing 152 at the other side of the body and reenforcing strips 428 and 429 are preferably coextensive therewith. A plurality of bolts 431, provided with washers 432 and nuts 433 at their inner threaded ends, pass through strips 428 and 429, the double end of sheet 427 and seat 426 to securely clamp sheet 427 upon body section 413. Since sheet 427 is flexible and compressible, this joint is fluid tight.

As shown in Figure 33 the front body section is provided with a forwardly inclined main frame end member 434, similar to member 419, which extends between wheel housings 149 and 148 and a transverse roof brace angle 435. Roof covering 436 is preferably secured to members 434 and 435 in the same manner that rear roof cover 425 is secured to members 424 and 419. The forward end of flexible sheet 427 is preferably secured to member 434 in the same manner by which its rear end is secured to member 419 as shown in Figure 35. Thus, the joint assembly designated at 437 in Figure 33 is practically identical with that illustrated in Figure 35.

At its inner side body frame member 419 is provided with a plurality of forwardly projecting plates 438 preferably welded thereto. The free ends of plates 438 are interconnected by an angle strip 439 which extends about body section 413 coextensively with member 419. Plates 438 and strip 439 combine to form a side wall and ceiling support within the coach at the front end of body section 413. A similar side wall and ceiling support comprising plate 441 and end strip 442 projects rearwardly from member 434 into the space between the body sections. Care is taken to incline strips 439 and 442 sufficiently to prevent contact between these members upon maximum flexure conditions in the vehicle.

In operation when the chassis members are caused to oscillate about the axis of rod 126, each body section 412 and 413 follows the movement of its supporting chassis section. Member 427 is preferably a sheet of two-ply rubber and cord sheathing which is extremely tough and resistant to weather conditions. It will be noted that member 427 is secured to body points which are somewhat removed from the actual adjacent edges of the rigid body sections. The purpose of this arrangement is to provide enough material in sheet 427 to permit full flexibility of the sheet during periods of maximum distortion of the vehicle body without straining the sheet beyond the elastic limit.

The vehicles of the present invention are much longer and roomier than the buses and other passenger transportation vehicles now in general use but are capable of maneuvering in practically the same areas. For example, the vehicle shown in Figure 36 has a turning radius which is substantially the same as that of a shorter vehicle terminating at driving axle 131. Rear wheels 382 and 383 turn in opposite directions from front wheels 304 and 305 as explained above and track almost exactly with the front wheels so that the turning radii of the various portions of the coach are substantially the same as a shorter coach terminating above axle 131.

This steering arrangement does not cause wear on the driving wheels because they are not subjected to sudden transverse sliding movements along the road while the vehicle is being turned as would be the case if the front and rear wheels were not designed to track in this manner. The vehicles of the invention are, therefore, adapted to turn at substantially any corner or street bend at which the passenger vehicles now in use are capable of turning, and, therefore, can be fitted into present mass transportation schemes with ease.

The vehicles of the invention are usually designed for about fifteen percent maximum grade wherein the flexure of the body and the especially designed flexible drive axle suspensions above described prevent any of the drive wheels from being lifted from the ground as would probably be the case if the coach shown in Figure 37 were a long rigid vehicle. The coach of Figures 37 and 38 comprises two rigid end sections 443 and 444 interconnected by a flexible section 445 and is preferably cut away at the front and rear as designated at 446 to clear the roadway when entering and leaving grades.

It will be seen, therefore, that the coaches and other vehicles of the invention are especially designed for the speedy handling of mass transportation due to their large capacity and carefully planned seating and passenger accommodation arrangements. These coaches are also designed to be used on city streets and other thoroughfares where it is now necessary to use small capacity coaches because no large capacity coaches capable of maneuvering upon these streets have been heretofore available. Applicant's flexible body and chassis designs satisfy a long felt want in the transportation field, and are also capable of use in long trucks and other road vehicles.

If desired, more than two section coaches may be used, although practically it has been found that two sections are sufficient to take care of normal demands. No matter how many sections are used, however, the connections between the sections are substantially the same as above described. Furthermore, the principles of the invention may be applied and extended for use on trailers or the like and other large capacity road vehicles.

The coaches of the invention include mostly standard parts which are available in existing repair stations and thus are capable of quick and easy repair without the use of expensive tools and other apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a trackless roadway vehicle, a pair of chassis sections interconnected by a transverse pivotal joint, open ended body sections rigid with said chassis sections, means distinct from said pivotal joint for pivotally interconnecting said body sections and an elastic wall bridging adjacent edges of said body sections.

2. An elongated highway vehicle comprising a pair of individually rigid open ended combined body and chassis sections interconnected pivotally by a transverse joint, a sheet of resilient material defining flexible body walls between said sections bridging adjacent edges of said sections, said sheet being disposed substantially in the planes of the side walls and roof of the body, and means for securing opposite ends of said sheet to said sections at points longitudinally removed a substantial distance from said adjacent section edges so that said sheet is of sufficient size to permit desired flexibility of the body during normal operation without exceeding the elastic limit of said sheet.

3. In a trackless roadway vehicle, a pair of chassis sections, means pivotally interconnecting said chassis sections including a transverse pivot member projecting laterally of said chassis sections, separate body sections rigid with said respective chassis sections and means including said pivot member laterally of said chassis section for pivotally interconnecting said body sections.

4. In a trackless roadway vehicle, a pair of chassis sections; a joint interconnecting said chassis sections comprising projecting apertured ears on each of said chassis sections and a transverse rod passing through said ears to terminate laterally of said chassis sections; body sections rigid with said respective chassis sections; elastic wall means interconnecting said body sections above said joint and means on said body sections cooperating with the ends of said rod for pivotally interconnecting said body sections.

5. In a trackless roadway vehicle, a pair of rigid combined body and chassis sections; a pivotal joint between said sections comprising a transverse rod, projections on each of said sections, bearing means providing a freely pivotal connection between said rod and the projections on one of said sections, means rigidly connecting said rod to the projections on the other of said sections and means maintaining said sections against flexure transversely of said vehicle; a resilient body wall above said joint and bridging said sections; floor means in each of said sections and means directly above said joint providing a substantially continuous floor portion interconnecting said floor means regardless of flexure of the vehicle about said joint; and a pivotal connection between opposite ends of said rod and opposite rigid side walls of said sections.

6. In a trackless roadway vehicle, a pair of chassis sections interconnected by a pivotal joint designed to permit flexure of the vehicle about a transverse axis but to prevent longitudinal flexure of said vehicle, a member projecting from said joint transversely of said chassis sections at one side of the vehicle, body sections rigid with said chassis sections respectively, means including said projecting member for pivotally interconnecting said body sections at said body side, and a flexible body wall bridging said body sections above said joint.

7. A highway vehicle comprising an elongated unitary box-like combined body and chassis comprising a pair of individually rigid body sections interconnected by a transverse horizontal pivot, said sections being open to each other at adjacent ends and having their side walls equally spaced so that said body is of uniform width from end to end; flexible wall means interconnecting said sections at said pivot and comprising substantial continuations of the side and roof walls of said sections so that said body is provided with substantially continuous longitudinal walls from end to end; a transverse axle at the front end of the front section provided with dirigible wheels at opposite ends beneath opposite sides of the body and a second transverse axle adjacent the rear of the rear section provided with dirigible wheels at opposite ends beneath opposite sides of said body, said dirigible wheels being cooperatively operable to steer said vehicle and said body being rigid against lateral flexure throughout its length; a transverse drive axle supporting said body intermediate its ends adjacent said pivot and drive wheels at opposite ends of said axle beneath opposite sides of said body; and springs in the connections between said axles and body.

8. In a highway vehicle, an elongated unitary box-like body comprising a pair of individually rigid combined body and chassis sections, a transverse horizontal pivot interconnecting said sections but said body being rigid against lateral flexure throughout its length, transverse axles supported at opposite ends by dirigible wheels beneath opposite sides of said body and disposed beneath front and rear sections respectively, a drive axle supported at opposite ends by drive wheels beneath opposite sides of the body and disposed beneath said front section adjacent said pivot, and flexible and elastic walls interconnecting said body sections above said pivot.

9. An elongated large capacity passenger carrying highway vehicle comprising a unitary combined body and chassis including a pair of pivotally interconnected individually rigid body sections having adjacent ends open to each other, flexible body side and roof walls bridging said adjacent section ends, a continuous uninterrupted floor extending substantially the entire length of said body, said floor having a flexible portion adjacent said pivotal connection and between said sections, dirigible wheel supported axles resiliently supporting opposite ends of the body and a drive wheel supported axle supporting said body forwardly of said pivotal connection; means providing passenger seating along the sides walls of said body said floor being unobstructed between said seating means, an entrance doorway in the front section opening to said floor at the front corner of the body forwardly of the front axle at the curb or loading side, an exit doorway in the rear section opening to said floor at the same side of the body and located a substantial distance rearwardly of the pivotal connection between the sections and forwardly of the rearmost axle whereby the passenger load is balanced and unimpeded and smooth circulation of the passengers between the sections within the body is provided.

10. An articulated body for a highway vehicle comprising a pair of flexibly interconnected body sections having adjacent ends open to each other, rigid passage floors in said body sections normally lying substantially in the same plane but capable of relative inclination as the body flexes, means preventing relative lateral displacement of said floors and compressible means carried by said floors bridging and sealing the space between them in all positions of relative inclination of said floors.

11. An elongated highway vehicle comprising a unitary box-like body comprising individually rigid front and rear combined body and chassis sections interconnected by a flexible body section and having adjacent ends open to each other so as to provide unobstructed passage therebetween, said rigid sections being so interconnected that said body is rigid against lateral flexure but flexible about a transverse joint intermediate its ends at said flexible body section; a transverse axle beneath the front section and dirigible wheels supporting opposite ends of said axle beneath opposite sides of the body; a second transverse axle beneath the rear section and dirigible wheels supporting opposite ends of said second axle beneath opposite sides of the body; a transverse drive axle intermediate said above axles and disposed adjacent said transverse joint and drive wheels upon opposite ends of said drive axle beneath opposite sides of the body; and resilient means interconnecting said axles and body.

12. In the highway vehicle defined in claim 11, said drive axle and the drive wheels thereon being disposed beneath the front section.

13. An elongated highway vehicle comprising a unitary box-like body comprising individually rigid front and rear combined body and chassis sections interconnected by a flexible body section and having adjacent ends open to each other so as to provide unobstructed passage therebetween, said rigid sections being so interconnected that the body is rigid against lateral flexure but flexible about a transverse joint intermediate its ends; dirigible ground engaging supporting wheels resiliently connected to the forward part of the front section; dirigible ground engaging supporting wheels resiliently connected to the rear part of said rear section; and a transverse drive axle supported by drive wheels beneath opposite sides of the body resiliently connected to the rear part of said front section.

14. In a vehicle, a pair of rigid body sections interconnected by a transverse horizontal pivot and defining an elongated unitary body flexible about said pivot but rigid against lateral flexure throughout its length, floor portions on the respective body sections terminating adjacent each other and normally lying in the same plane but capable of relative angular displacement as said vehicle flexes about said pivot, compressible and expansible strip means disposed between adjacent edges of said floor portions for providing a substantially continuous, even and uninterrupted floor along said entire body regardless of the flexure of said body about said pivot and rigid flat plates extending toward each other from said adjacent floor portion edges and said strip means being recessed to interfit with said plates.

15. An elongated highway vehicle comprising a unitary box-like body consisting of two individually rigid body sections having adjacent ends open to each other, normally aligned floors in each of said body sections and compressible means bridging adjacent ends of said floors, means below the level of said floors pivotally interconnecting said body sections so that the body is flexible about a transverse joint but rigid against lateral flexure throughout its length, and flexible body walls interconnecting the adjacent ends of said body sections.

16. In the vehicle defined in claim 15, said means pivotally interconnecting the body sections comprising longitudinally projecting apertured ears rigid with the adjacent ends of said body sections and a pivot rod extending through said ears, and said compressible means comprising a strip of flexible material supported by said floors and extending parallel to and in substantial vertical alignment with said rod.

17. An articulated body for a highway vehicle comprising a pair of flexibly interconnected body sections having adjacent ends open to each other, rigid passage floors in said body sections normally lying substantially in the same plane but capable of relative inclination as the body flexes, means preventing relative lateral displacement of said floors and means carried by said floors bridging and sealing the space between them in all positions of relative inclination of said floors.

FRANK R. FAGEOL.
WILLIAM B. FAGEOL.

CERTIFICATE OF CORRECTION.

Patent No. 2,251,584. August 5, 1941.

FRANK R. FAGEOL, ET AL.

It is hereby certified that error appears in the printed specification of the above numbered patent requiring correction as follows: Page 6, second column, line 72, for the reference numeral "17" read --217--; page 8, first column, line 52, for "34" read --334--; page 11, second column, line 54, claim 7, for the words "combined body and chassis" read --body--; line 55, same claim, for "body" read --combined body and chassis--; page 12, first column, line 33, claim 9, for the word "sides" read --side--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.